Figure 1:
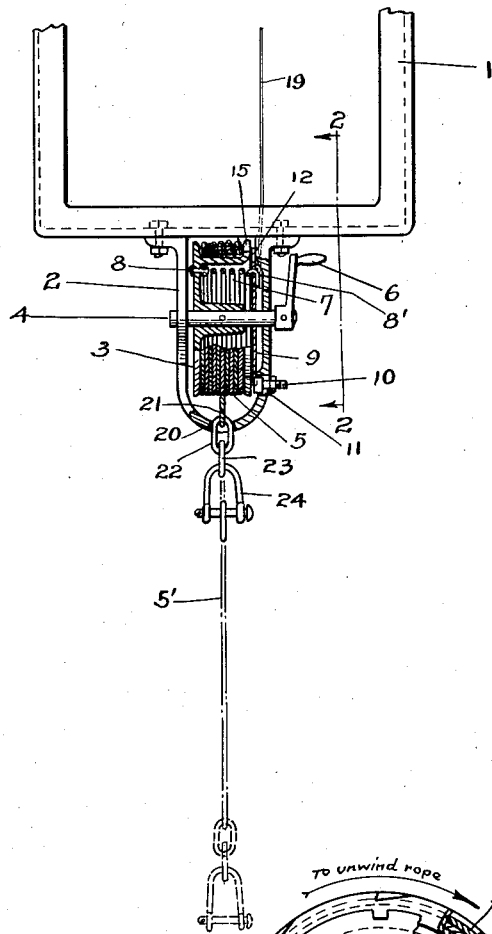

Dec. 22, 1925.

C. T. FORREST

TRACTOR HITCH

Filed Aug. 28, 1924

1,566,740

INVENTOR
CURTIS T. FORREST.

BY Munn & Co.

ATTORNEYS.

Patented Dec. 22, 1925.

1,566,740

UNITED STATES PATENT OFFICE.

CURTIS T. FORREST, OF LE GRAND, CALIFORNIA.

TRACTOR HITCH.

Application filed August 28, 1924. Serial No. 734,759.

*To all whom it may concern:*

Be it known that I, CURTIS T. FORREST, a citizen of the United States, and a resident of Le Grand, county of Merced, and State of California, have invented a new and useful Tractor Hitch, of which the following is a specification.

This invention relates to means for connecting trailers, agricultural implements or other rolling or drag devices to tractors, automobiles or other vehicles.

The object of my invention is to provide a vehicle connection or hitch for the purpose outlined which will permit relative separation of the drawing and drawn vehicles under certain haulage conditions, principally such as when encountering mud holes on the road or soft areas in field operations.

In the drawings hereto Figure 1 is a plan view of the rear end of a tractor or other road vehicle frame with my trailer connection secured thereto and extending rearwardly therefrom, and with fragments of the device broken away to reveal the internal construction.

Figure 2:
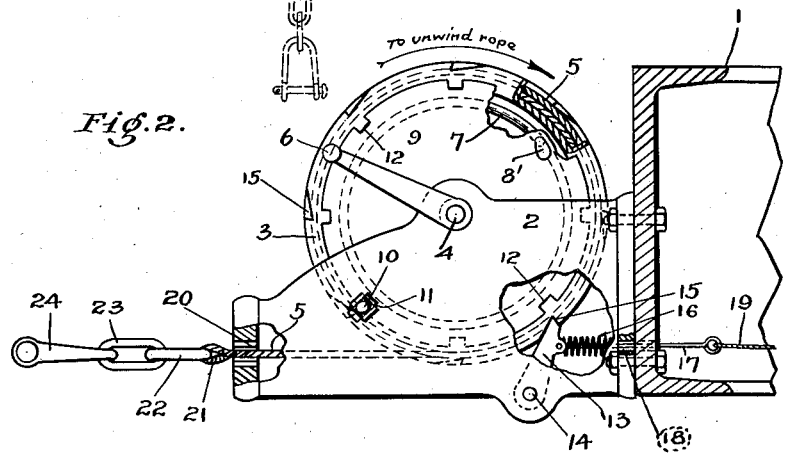

Figure 2 is a side elevation of the device as seen from line 2—2 of Figure 1, but with the handle extending at a different position to promote clarity, and with the haulage chain pulled slightly away from the bracket of the device.

Briefly described the invention consists of a drum revolvably mounted on the tractor frame and a haulage rope wound up on the drum with the free end adapted for connecting to the trailer or other device to be hauled, so that upon getting stalled in a mud hole the drum may be unlocked to revolve and pay off the rope while the tractor passes along to a better road surface whereupon the drum is locked and the trailer pulled through the mud by advancing the tractor.

When the trailer has been pulled out of the mud the tractor is backed up and the rope rewound on the drum to bring the vehicles in close coupled relation as at the start.

In the drawings 1 represents the rear end of the tractor frame, 2 a bracket bolted or otherwise secured thereto, 3 a flanged rope drum secured to a shaft 4 revolvably supported by the bracket.

The drum is preferably rather narrow and adapted to take several superimposed layers of wire haulage rope 5 and is preferably spring actuated, so as to keep the rope always snugly wound upon the drum though it may also be provided with a hand crank 6 for rewinding by hand either to assist the spring toward the final windings or to be used in case of spring breakage.

If the spring is used it takes the form of a coil 7 positioned within the drum with an end 8 of the coil spring bolted to the drum, while the other end 8' is hooked into an adjusting disk 9 loosely supported on the drum shaft 4.

This adjusting disk 9 is free to turn for the purpose of winding up the spring to proper tension for rewinding the rope, and the disk is locked in adjusted position by means of a bolt 10 slidable in a slot 11 in the bracket and which is engaged into any of the notches 12 in the edge of the disk.

After paying out or unreeling a sufficient length of rope and it is desired to advance the tractor and use the extending rope for haulage, as mentioned, the drum is locked against further unwinding by a pawl 13 which is pivoted to the bracket at 14 and normally forced into contact with the locking notches 15 by a spiral compression spring 16 coiled about the pull link 17.

The pull link 17 passes through a hole 18 in the tractor frame and is connected to a cord or chain 19 extending to the driver (not shown) so that it may be pulled to free the drum when desired.

As the rope or cable 5 unwinds from the reel, as shown dotted at 5', it is guided by a hole 20 in the casting bracket 2, and at the end is secured at 21 to a chain link 22 which is followed by another link 23 and then a clevis 24 for securing to the trailer to be hauled.

The hole 20 in the bracket will not pass the link but is formed to receive it in the position shown in Figure 1 so that it will firmly seat itself therein upon rewinding the rope and thus form a firm short coupling and avoid any tendency to flex the rope while hauling and which might cause the rope to crystallize and break.

In contemplating my invention it will be manifest that many variations in its detailed construction, arrangement of pawl, bracket, etc., may be made by any mechanic without departing from the spirit of the invention, also that the device may be secured to any part of the tractor frame, even close to the driver, and the haulage rope guided by any means for emergence at any desired point where it is desired to hitch the trailer or other vehicle and any such apparent modifications of my invention are intended to be covered in my appended claims.

I claim:

1. In a tractor hitch of the character described, a reel rotatably mounted on the tractor frame with a haulage rope secured to and wound around the reel, said rope extending rearward of the tractor for hitching to a trailer or the like, means for locking the reel against unreeling rotation and both automatic and manually operated means for rewinding the reel.

2. In a tractor hitch of the character described, a reel rotatably mounted on the tractor frame with a haulage rope secured to and wound around the reel, said rope extending rearward of the tractor for hitching to a trailer or the like, means for locking the reel against unreeling rotation, and means for rewinding the reel, said means comprising a coiled spring within the reel with one end secured thereto and the other end reacting against the reel mounting and provided with means for adjusting the tension of the spring.

3. In a tractor hitch of the character described, a bracket adapted for securing to a tractor frame, a reel rotatably mounted on the bracket, a rope secured to and wound around the reel and extending rearward of the tractor, a guide for the extending rope with a socket therein, a haulage link secured to the rope adapted to seat within the socket upon winding up the rope upon the reel, means for rewinding the reel and means for locking same against revolution.

CURTIS T. FORREST.